(12) United States Patent
Narayana et al.

(10) Patent No.: US 7,620,937 B2
(45) Date of Patent: Nov. 17, 2009

(54) SYSTEM AND METHOD FOR DEBUGGING PROGRAMS

(75) Inventors: Papineni Venkata Narayana, Bangalore (IN); Nigale Yadneshwar Bhushan, Bangalore (IN); Kompaili Narayana Durga Prasad, Sandhausen (DE)

(73) Assignee: SAP AG, Walldorf (DE)

( * ) Notice: Subject to any disclaimer, the term of this patent is extended or adjusted under 35 U.S.C. 154(b) by 515 days.

(21) Appl. No.: 10/923,215

(22) Filed: Aug. 20, 2004

(65) Prior Publication Data

US 2006/0041865 A1 Feb. 23, 2006

(51) Int. Cl.
*G06F 9/44* (2006.01)

(52) U.S. Cl. .................. 717/124; 717/125; 717/126; 717/127; 717/130; 714/38

(58) Field of Classification Search .......... 717/102, 717/103, 106, 111, 115, 124, 127, 128, 130, 717/137, 112
See application file for complete search history.

(56) References Cited

U.S. PATENT DOCUMENTS

| 5,842,019 | A | * | 11/1998 | Kolawa et al. ............ 717/130 |
| 6,126,330 | A | * | 10/2000 | Knight .................... 717/127 |
| 6,202,199 | B1 | * | 3/2001 | Wygodny et al. .......... 717/125 |
| 6,249,907 | B1 | * | 6/2001 | Carter et al. .............. 717/129 |
| 6,311,327 | B1 | * | 10/2001 | O'Brien et al. ........... 717/114 |
| 6,604,210 | B1 | * | 8/2003 | Alexander et al. ......... 714/39 |
| 6,957,421 | B2 | * | 10/2005 | Hundt et al. .............. 717/130 |
| 7,016,807 | B2 | * | 3/2006 | Morimoto et al. .......... 702/183 |
| 7,137,105 | B2 | * | 11/2006 | Madsen et al. ............ 717/128 |
| 2003/0177441 | A1 | * | 9/2003 | Clarke et al. .............. 715/513 |
| 2004/0031020 | A1 | * | 2/2004 | Berry et al. ............... 717/130 |
| 2004/0117769 | A1 | * | 6/2004 | Lauzon et al. ............. 717/125 |
| 2004/0205571 | A1 | * | 10/2004 | Adler et al. ............... 715/513 |
| 2005/0039187 | A1 | * | 2/2005 | Avakian et al. ............ 719/310 |
| 2005/0114779 | A1 | * | 5/2005 | Griesmer ................. 715/711 |

FOREIGN PATENT DOCUMENTS

EP 1170661 A2 * 1/2002

OTHER PUBLICATIONS

Mireille Ducasse and Jacques Noye, "Tracing Prolog Programs by Source Instrumentation is Efficient Enough", 1998, Implementation Technology for Programming Languages Based on Logic, retrieved from: http://citeseer.ist.psu.edu/177297.html.*

Alastair Penney, "Augmenting Trace-based Functional Debugging", Sep. 1999, PhD Thesis, Department of Computer Science, University of Bristol, section 4.5. retrieved from: http://www.cs.bris.ac.uk/Publications/pub_info.jsp?id=1000398.*

(Continued)

*Primary Examiner*—Lewis A Bullock, Jr.
*Assistant Examiner*—Jue S Wang
(74) *Attorney, Agent, or Firm*—Kenyon & Kenyon LLP

(57) ABSTRACT

A system and method for debugging programs such as Extensible Stylesheet Language (XSL) programs. A processor may locate program element tags in an XSL program code, may modify the XSL program code by inserting for each located program element new code that, when executed, implements a routine coded in a state-maintaining language and that generates a debugging comment, and may execute the modified XSL program code.

37 Claims, 6 Drawing Sheets

OTHER PUBLICATIONS

Elliotte Harold, "Processing XML with Java A Guide to SAX, DOM, JDOM, JAXP, and TrAX", Nov. 2002, Chapter 17, section 3, retrieved from: http://www.cafeconleche.org/books/xmljava/chapters/ch17s03.html.*

Sal Mangano, "XSLT Cookbook", Dec. 2002, O'Reilly, section 13.3.*

Eric Bae and James Bailey, "CodeX: An Approach for Debugging XSLT Transformations", Dec. 2003, Proceedings of the Fourth International Conference on Web Information Systems Engineering, 2003.*

Matt Welsh and David Culler, "Jaguar: Enabling Efficient Communication and I/O in Java", 2000, Concurrency: Practice and Experience, vol. 12, No. 7.*

Sal Mangano, "XSLT Cookbook", Dec. 2002, O'Reilly, sections 13.1, 13.2, 13.4.*

Karthik Ravindran, "Troubleshooting .Net applications Implementing an XslTransformation wrapper to trace and profile XSLT transformations Part 1", Sep. 2003, .Net Developer's Journal, vol. 1, Issue 9.*

O'Donnell et al., "Debugging in Applicative Languages", 1988, Lisp and Symbolic Computataion, pp. 113-145.*

Arnold et al. "A Framework for Reducing the Cost of Instrumented Code", 2001, ACM SIGPLAN Notices, vol. 36, Issue 5.*

Kesselman "Style stylesheets to extend XSLT, Part 2", May 2003, IBM developerWorks, including the file tracexsl-sample3.traceResult which is a sample output generated and included as a link in the article.*

Joseph Kesselman, "Style stylesheets to extend XSLT, Part 1," http://www-106.ibm.com/developerworks/xml/library/x-styless1/, May 6, 2003.

Joseph Kesselman, "Style stylesheets to extend XSLT, Part 2," http://www-106.ibm.com/developerworks/xml/library/x-styless2/, May 13, 2003.

Uche Ogbuji, "Debug XSLT on the fly," http://www-106.ibm.com/developerworks/xml/library/x-debugxs.html, Nov. 1, 2002.

Bob Stayton, DocBook XSL: The Complete Guide (2d ed. 2003), Appendix B., "Debugging XSL Stylesheets," available at http://www.sagehill.net/docbookxsl/Debugging XSL.html.

* cited by examiner

```
Entered root
    . . .
    variable Consumer has value GAMMA
    variable MAPGUID has value 455133FG9
    Entered template compose_SYS_GUID
        Entering xsl:when not($SKIP)
            variable SGUID has value 088B_GAMMA
            variable MAPGUID has value 9HD77B6A3
            Entering xsl:for
                Entering xsl:if
                Exiting xsl:if
            Exiting xsl:for
        Exiting xsl: when not($SKIP)
    Exiting template compose_SYS_GUID
    . . .
        . . .
```

FIG. 2

SYSTEM AND METHOD FOR DEBUGGING PROGRAMS

BACKGROUND

Programmers may write programs to perform particular intended operations. However, when implemented, programs often fail to perform as intended. For example, a program may not perform the intended operation, and/or may even perform an unintended operation. Therefore, a programmer conventionally debugs a program, e.g., if the programmer discovers a program error. By debugging the program, the programmer may discover, e.g., where a variable is set with an incorrect value or where a program incorrectly enters or exits a logic path, such as a "for-each" loop.

Some programming languages present program elements as nodes in a tree-like structure. An example of such a program is an Extensible Stylesheet Language (XSL) program. For example, a program variable of an XSL program may be a child node of a parent node, i.e., another program element, such as another program variable. For example, a variable "contact" may have child nodes. The child nodes may be a variable "name" and/or a variable "address." Each of these child nodes may have further child nodes. For example, variables "first_name" and "last_name" may be child nodes of variable "name."

A logic path may be another type of programming element. A logic path of a program may be, for example, an application of a template to input of the program, a "for-each" loop, a "when" condition, an "if" condition, etc. These programming elements may also be presented in a tree-like structure. For example, a "for-each" loop may be nested. Thus, one loop may be within another loop. The inner loop may be viewed as a child node of the outer loop.

To debug a program, a programmer may input the program into a debugging system. The debugging system may output debugging comments that indicate the manner in which the program is executed. In a conventional debugging system for debugging a program, e.g., an XSL program, such as an Extensible Stylesheet Transformations (XSLT) program, the programmer may select a particular line of the program's code. Upon initiation, the debugging system may execute the program until the debugging system reaches the selected line and may output information about the program at the selected line. However, this debugging system requires the programmer to tediously select numerous program lines until the programmer finds the error causing program code. Furthermore, this debugging system does not provide the programmer with information regarding the overall program operation simultaneously. Rather, such information is provided piecemeal, and the programmer must determine the program's overall operation from the provided piecemeal information.

Alternatively, it is conventional for a programmer to add debugging program code to a program in order to debug the program. For example, a programmer may add to an XSL program an <xsl:message> tag to output a debugging comment. Such debugging program code may output debugging comments, e.g., that indicate information about the program element, such as a variable's value, at a point of the program's execution that corresponds to the portion of program code to which the programmer added the debugging code. The debugging program code may send the debugging comments, e.g., to a printout or to a computer screen, located in an output location different than that of the program's main output, i.e., the output that pertains to the intended operation of the program. For example, the <xsl:message> tag sends an output comment to Standard Error on Unix, a location that is different than the location to which the main output is sent. However, this manner of program debugging requires a programmer to manually enter debugging code into an XSL program. Furthermore, the outputted debugging comments are not integrated with the program's intended output. Consequently, some, if not all, of the program context of the debugging comments is not provided.

Furthermore, a programmer may debug a program, e.g., in order to ultimately discover which section of code within a program, e.g., which node of a tree-structured program, causes the incorrect results. Conventionally, debugging comments are output without an indication of the particular node to which the comment relates. Therefore, even if the debugging comments are integrated with the output of the program being debugged, it is still required for the programmer to keep track of the generated comments to determine the node to which a particular comment pertains.

It is conventional to provide an indication of the columns and lines of the code section to which a generated comment pertains. However, such information does not indicate a node to which the comment relates. It is required for the programmer to read the referenced code and determine how the relevant code relates to the program's tree-structure.

Additionally, some programming languages, such as XSL, do not provide the capability of maintaining state information of the executed code. As used herein, state information refers to information regarding a state or sequence of a program's execution. For example, XSL does not provide the capability to keep track of the columns and lines of execution or to keep track of the nodes that have been executed.

Consequently, code of the program being debugged, e.g., the XSL program, is conventionally not modified to generate the debugging comments that include state information. Instead, to generate the debugging comments that indicate the columns and lines of the corresponding code, it is conventional to execute debugging code that is external to the program being debugged. However, the debugging comments are therefore not integrated with the output of the program being debugged. For example, the debugging comments may be provided in one window and the output of the program being debugged may be provided in a different window. It is then required for the programmer to determine how the debugging comments relate to the output of the debugged program.

Generation of code in an XSLT program for outputting debugging comments integrated with a main output of the XSLT program is discussed in Joseph Kesselman, "Style stylesheets to extend XSLT, Part 1," http://www-106.ibm-.com/developerworks/xml/library/x-styless1/, (May 6, 2003), and in Joseph Kesselman, "Style stylesheets to extend XSLT, Part 2," http://www-106.ibm.com/developerworks/xml/library/x-styless2/, (May 13, 2003), (collectively "Kesselman"). However, Kesselman discusses generation of code that, when executed, will generate debugging comments for only a template element of a program. Kesselman does not provide a way to trace other program elements, such as program variables. Furthermore, Kesselman does not provide a way to generate debugging comments that indicate the particular sections of code to which the comments pertain. For example, the columns and lines of code that correspond to the debugging comments are not provided. Furthermore, the debugging comments do not indicate the particular nodes to which the comments relate.

It is therefore desirable to provide a system and method for automatically generating debugging comments for a program of a tree-structured language that does not maintain state

BRIEF DESCRIPTION OF THE DRAWINGS

FIG. 2 illustrates example debugging comments output according to an embodiment of the present invention.

DETAILED DESCRIPTION

Embodiments of the present invention relate to automatically generating debugging comments for a program coded in a non state-maintaining language. A processor may insert code for calling a routine coded in a state-maintaining language.

Particularly, the embodiments relate to programs of particular program languages that may present program elements as nodes in a tree-like structure, e.g., an XSL program.

Figure 1:
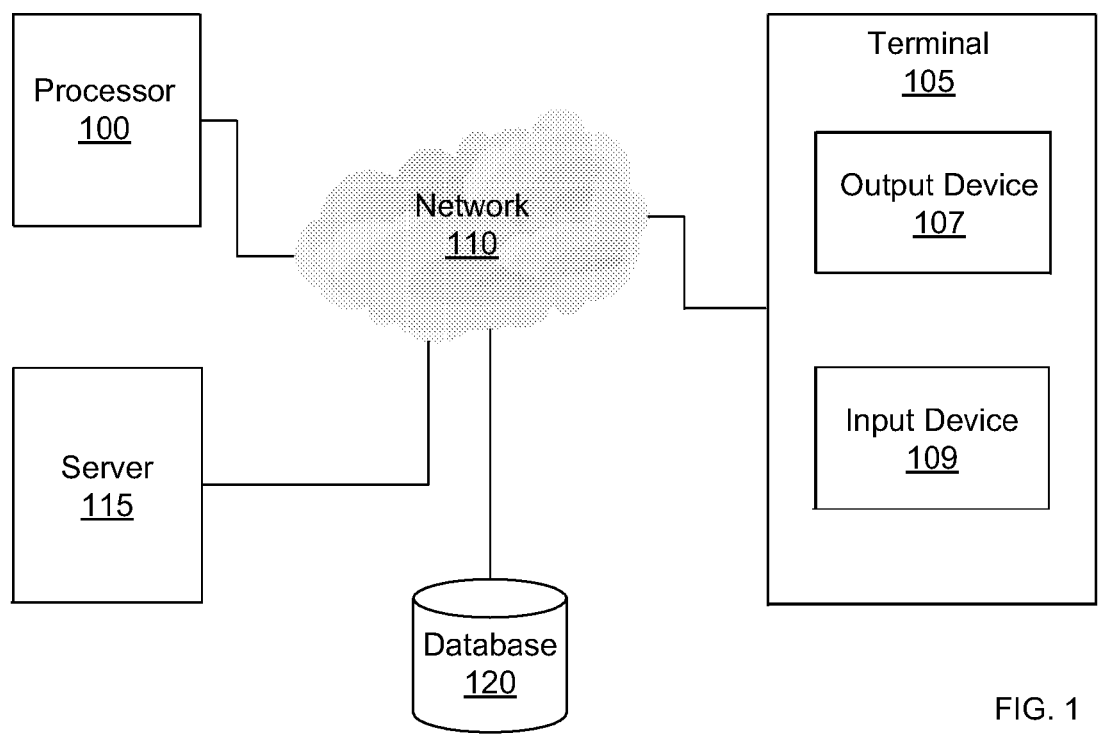
FIG. 1 is a block diagram that illustrates example components of a debugging system, according to an embodiment of the present invention.

FIG. 1 is a block diagram that illustrates example components of a debugging system. In one embodiment of the present invention, a processor 100 may be in communication with a terminal 105, e.g., via a network 110. Alternatively, the processor 100 may be integrated with the terminal 105. The processor 100 may execute a program and may send the program's output to a user, e.g., a programmer, via an output device 107, e.g., a printer, a graphical user interface (GUI), or any conventional output device. The programmer may send input to the processor 100 via an input device 109, e.g., a keyboard, a mouse, or any conventional input device.

In an embodiment of the present invention, a programmer may transmit a program toward the processor 100 for the processor 100 to debug the program. The processor 100 may modify the program to include code for generating debugging comments. The code may be included throughout the program in order to generate the debugging comments as program output at various points during the program's execution. Subsequently, the processor 100 may execute the modified program. During execution of the program, when the processor 100 encounters the newly included code, the processor 100 may generate a debugging comment. The processor 100 may send the program's main output to the output device 107. The processor 100 may also execute the newly included code as part of the program's main code, in order to integrate the debugging comments with the program's main output. For example, the program may define a sequence in which to present the main output. The processor 100 may insert the debugging code in the program so that the sequence is modified. The modified sequence may provide for the output of the debugging comments. The integrated main output and debugging comments may be displayed, e.g., in a single display window of a GUI. The displayed debugging comments may be interspersed throughout the displayed main output.

In an embodiment of the present invention, the processor 100 may generate debugging comments, i.e., the processor 100 may insert debugging comment code, for particular significant program elements. For example, a significant program element may be a variable definition, a variable value-setting event, entry into and/or exit from a logic path, etc. A logic path of a program may be, for example, an application of a template to input of the program, a "for-each" loop, a "when" condition, an "if" condition, etc.

In an embodiment, the processor 100 may generate a debugging comment each time a value is set for a program variable. The comment may, e.g., identify the program variable and indicate its value at the point of the program's execution where the comment is generated.

In an embodiment, the processor 100 may generate a debugging comment each time the program enters a logic path. For example, the comment may identify the logic path and may indicate that the program is entering the logic path. Similarly, the processor 100 may generate a debugging comment each time the program exits a logic path. The comment may indicate that the program is exiting the logic path.

In an embodiment of the present invention, the processor 100 may generate a debugging comment each time the program enters and exits a particular logic path, but may generate a debugging comment for other logic paths only when the program enters the other logic paths. For example, in one embodiment, to avoid excessive generation of comments, the processor 100 may automatically generate the exit comment for only a program template. In an alternative embodiment, a user may select particular logic paths for which the processor 100 is to generate the exit comment. The processor 100 may accordingly generate the exit comment.

A programmer may be concerned with the treatment of particular program elements during execution of the program and may want to isolate those particular program elements for debugging. For example, a programmer may find in an output of a program an anomalous result with respect to a particular program variable and may want to trace all manipulations of the particular program variable during the program's execution. In an embodiment of the present invention, the processor 100 may generate debugging comments for only selected program elements. A programmer may select program elements and may indicate the selection to the processor 100 via the input device 109. For example, the processor 100 may display the program's code via the output device 107, e.g., a GUI. The programmer may select a program variable of the displayed code. For example, the programmer may press a key of a keyboard to shift a cursor to an area in which is displayed the program variable, point a mouse pointer at a program variable within the displayed code and may click the mouse to select the program variable, or select the displayed program variable in any other conventional manner. Similarly, the programmer may select an instance of a logic path. The processor 100 may generate a debugging comment for each occurrence within the program's code of the selected program variable and the selected logic path.

In one embodiment of the present invention, a programmer may select program elements by category. For example, if a programmer selects a program variable, the processor 100 may generate a debugging comment for each occurrence of any program variable. Similarly, if a programmer selects a template, the processor may generate a debugging comment for each occurrence of any template.

In an alternative embodiment, a programmer may select program elements on an individual basis. For example, if a program selects only a first of two program variables, the processor 100 may generate a debugging comment for each occurrence of only the first program variable.

In an embodiment of the present invention, the processor 100 may provide the programmer with the option of treating a selection as either a category selection or alternatively as a selection of an individual program element.

In an embodiment of the present invention, the processor 100 may insert code to generate debugging comments that include state information. For example, each debugging comment may indicate the lines and columns of the code that corresponds to the debugging comment. For example, the processor 100 may display the program's code. Code of a particular program element for which a debugging comment is generated may be located on one or more lines. The code may include one or more characters. Each space in which is displayed a character may be a column. Accordingly, the debugging comment's corresponding code may span one or more lines and one or more columns. Each displayed line and column may be assigned a number. The debugging comment may indicate the line and column numbers in which is located the code of the particular program element that corresponds to the debugging comment.

The state information of a debugging comment may also indicate the particular program node to which the debugging comment pertains. For example, the code, when executed, may produce debugging comments indented in a manner that indicates the nodes to which the debugging comments pertain. A file may be maintained. The file may include information regarding which program nodes have been executed. The file may be updated when a node is executed. Indentations of the debugging comments may be based on information of the file.

A program may be of a programming language that does not maintain state information, e.g., an XSL program. In an embodiment of the present invention, the processor 100 may insert code into such programs for generation of debugging comments that include state information. The inserted code, when executed, may call a routine of a different programming language, e.g., Java, C++, etc., that does maintain state information. The called routine may generate the debugging comments that include the state information.

In order to insert code for generating a debugging comment for an element of a program, the processor 100 may initially identify the program element within the program's code. In an embodiment of the present invention, the processor 100 may identify a program element based on a corresponding element tag, e.g., variable tags, template tags, if tags, etc. For example, an XSL program may include an <xsl:variable name="VARIABLE_NAME" select="'VALUE'"/> tag to set the value of a variable called VARIABLE_NAME equal to "VALUE." In this instance, the processor 100 may identify the variable VARIABLE_NAME by its corresponding <xsl: variable name . . . > tag. As an additional example, the XSL stylesheet may include an <xsl:template match="NAME"> tag to begin implementation of a template. The processor 100 may place code for generating a debugging comment for a program element immediately after the program element's tag.

In an embodiment of the present invention, the processor 100 may generate debugging comment code that, when executed, generates a message-dumping variable and that, in setting a value of the message-dumping variable, implements a routine. The program may be of one programming language, e.g., XSL, and the implemented routine may be of another programming language, Java. The message-dumping variable may be generated in order to hold a return value of the routine call. For example, the processor 100 may generate the message-dumping variable via the following XSL stylesheet tag, which, when executed, may implement a Java routine:

```
<xsl:variable name="MSG_DUMP"
select="debug:dumpVariable('VARIABLE_NAME',$VARIABLE)"/>.
```

The processor 100 may input parameters into the implemented routine. The routine, when executed, may output the debugging comment, e.g., to output device 107. In an embodiment, the processor 100 may choose one routine from a few routines based on the program element for which the debugging code is generated. The output generated by the various routines may vary. The input to be obtained by the routines may also vary, and the processor 100 may input the parameters accordingly. For example, for a program variable, the processor 100 may implement a routine that outputs the program variable's name and value. For a logic path, the processor 100 may implement a routine that outputs the logic path's name and an indication that the program is entering or exiting the logic path. For example, as illustrated in the preceding comment generating code for a program variable, the processor 100 may implement a routine that accepts as parameters two strings. For example, the processor 100 may call the following Java routine:

Public static void dumpVariable(String Variable, String Value).

The processor 100 may input the name of the program variable as the first string and the value of the program variable as the second string. The routine may output a comment that includes the name of the program variable and its value. By contrast, for a logic path, the processor 100 may implement a routine that accepts as parameters only one string that identifies the logic path and that states whether the program is entering or exiting the logic path. The inputted string may be used by the routine as part of the comment the routine outputs to the output device 107. For example, the processor 100 may call the following Java routine:

Public static void dumpText(String TextMessage).

According to an embodiment of the present invention, the routine may keep track of executed code and executed nodes. The routine may accordingly output a comment that indicates the column and line numbers of the code to which the comment pertains. The routine may additionally or alternatively indicate the particular node to which the comment pertains. For example, the routine may indent the comments so that a comment that pertains to a child node is offset with respect to a debugging comment that pertains to its parent.

For example, the processor 100 may generate a debugging comment for a template and for a program variable defined within the template. The processor 100 may accordingly indent the debugging comment pertaining to the program variable so that it is offset from the debugging comment generated for the entry into and the exit from the template. To format a debugging comment of a particular program element according to the program element's context, the processor 100, when executing the routine, may record, e.g., in a file, a list of the program's elements, e.g., program variables, and their interrelationships. The processor 100 may determine from the file the context of the particular program element with respect to other program elements and may accordingly format the debugging comment of the particular program element. Additionally, the processor 100, when executing the routine, may increment and decrement a tabulator variable in response to entering and exiting logic paths. The processor 100 may indent the debugging comments based on the tabulator variable. The processor may store the tabulator variable, e.g., in the file.

According to one embodiment of the present invention, to debug a program, the processor 100 may call the routine from a location external to the program. The external location may be located in the terminal 105. Alternatively, the external location may be external to the terminal 105. For example, the routine may be located in a second terminal or in a server 115. According to this embodiment, the processor 100 may include in the debugging code the external location in which the routine is located. For example, in the illustrated tag,

```
<xsl:variable name="MSG_DUMP"
select="debug:dumpVariable('VARIABLE NAME',$VARIABLE)"/>,
```

"dumpVariable" may be the routine's name, and "debug" may be the name of the routine's location.

In an embodiment of the present invention, the routine, when executed, may format its outputted debugging comment to enhance the comment's readability. For example, the processor 100, when executing the routine, may indent the debugging comments so that they are offset from the rest of the program's output.

The XSL programming language does not provide a way to access certain data not stored in the file system. For example, the XSL programming language does not provide a way to access data stored in a database. For example, an XSL program may retrieve data of a file stored in the computer file system. The directory name of the file may be included in the XSL program code. The XSL program, during execution, may retrieve data from the specified directory. However, if the XSL program code includes code intended for setting a value of a program variable based on data located at an inaccessible location, such as a database 120, the processor 100 may not be able to execute such code.

A routine for retrieving the data may be coded in a programming language, e.g., Java, that provides a way in which to access the data that is otherwise inaccessible to the XSL programming language. According to an embodiment of the present invention, before the processor 100 executes the modified program that includes code for generating debugging comments, the processor 100 may be set to utilize the Java data retrieving routine, rather than the XSL data retrieving routine. Accordingly, during execution of the modified program, when the processor 100 encounters code for retrieving the data that is inaccessible to XSL, the processor 100 may interpret the code as a call to the Java data retrieving routine, rather than to the XSL data retrieving routine. The processor 100 may then execute the Java data retrieving routine, for example to set a variable's value and indicate that value in a debugging comment.

In an embodiment of the present invention, to avoid excessive manipulation of a program's variables, before implementing the routine for a program variable, the processor 100 may create an interim variable and set its value equal to the program variable. Thereafter, the processor 100 may manipulate the interim variable instead of the program variable. For example, the processor 100 may input into the routine the interim variable, rather than the program variable.

In an embodiment of the present invention, the processor 100 may generate code for setting a value of the interim variable equal to a program variable's entire node-set. For example, the processor 100 may generate code such that when the processor 100 executes the code, the processor 100 may determine whether a program variable for which the interim variable is generated is a child node. If the program variable is a child node, the processor 100 may determine the program variable's parent nodes. The processor 100 may set the interim variable's value equal to an identification of the entire node-set, including the program variable and its parent nodes, and their respective values.

According to this embodiment, the processor 100 may input the value of the interim variable into the routine that outputs the debugging comment. When the code is executed, the interim variable's value may include the program variable's entire node-set. The entire node-set may therefore be input into the routine. Accordingly, the routine may output a debugging comment that identifies the program element's entire node-set and each node's values.

FIG. 2 illustrates example debugging comments output according to an embodiment of the present invention. The illustrated debugging comments have been indented to indicate the nodes to which the comments pertain. For example, after a program enters a template, the program may enter a "when not" path. The "when not" path may therefore be a child node of the template. Accordingly, the illustrated comment that indicates the program's entrance into the "when not" path is offset from the comment that indicates the program's entrance into the template. Similarly, a "for" path may be a child node of the "when not" path. An "If" path may be a child of the "for" path. The illustrated comments are accordingly indented.

A programmer who glances at the debugging comments as illustrated in FIG. 2 may quickly determine which program nodes have been executed. For example, a programmer may write a program that includes 10 nodes. However, during execution, the program may execute only 6 of the nodes, e.g., if the programmer included incorrect code. By glancing at the generated debugging comments, the programmer may quickly determine that only 6 nodes have been executed, and may determine which 6 nodes were executed.

Figure 3:
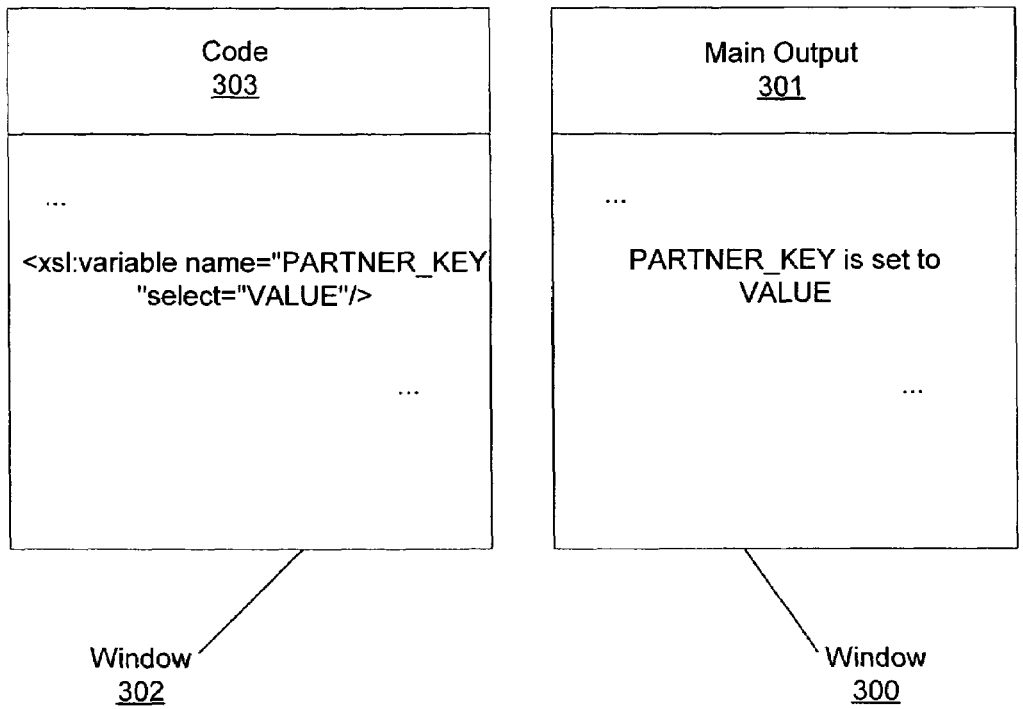
FIG. 3 is a block diagram that illustrates example windows for display of code and output, according to an embodiment of the present invention.

FIG. 3 is a block diagram that illustrates an example display of example output, according to an embodiment of the present invention. The output device 107 may be a GUI. The processor 100 may display the main output 301 of the program, including the integrated debugging comments, in a window 300 of the GUI 107. The processor 100 may simultaneously display in an adjacent window 302 the code 303 of the program. The processor 100 may format the main output 301 so that each line of output 301 is displayed adjacent to its corresponding program code 303. For example, each generated debugging comment may be positioned adjacent to its corresponding code, near its corresponding program element.

In one embodiment of the present invention the processor 100 may generate the debugging comments while executing a program in a debugging mode, and may withhold the debugging comments while executing the program in a normal mode. The processor 100 may obtain a program to be debugged. The processor 100 may copy the program as an interim program. The processor 100 may insert into the interim copy the code for generating debugging comments, and may leave unchanged the program to be debugged. While executing the program in a debugging mode, the processor 100 may execute code of the interim copy and display its output, which may include the debugging comments, in the output device 107. While executing the program in a normal mode, the processor 100 may execute code of the original copy and display its output, which does not include the debugging comments, in the output device 107.

According to the embodiment in which the processor 100 inserts debugging code into an interim program code, the processor 100 may display in one window 302 the code 303 of the original copy of the program, and may display in an adjacent window 300 the output 301 of the interim copy of the program, including the debugging comments. The debugging comments of the interim copy may be displayed directly adjacent to or approximately adjacent to the original copy's corresponding program elements.

In an embodiment of the present invention, an intellisense option may be selected. When the intellisense option is selected, a user may position, e.g., a mouse pointer or a cursor to be on or within close proximity of a portion of the code displayed in the window 302 that represents a particular program element for which a debugging comment has been generated. In response to such positioning of the pointer or cursor, the processor 100 may display within the window 302 the corresponding debugging comment. For example, the processor 100 may superimpose the debugging comment over the corresponding code or may alternatively display the debugging comment near the corresponding code.

Figure 4:
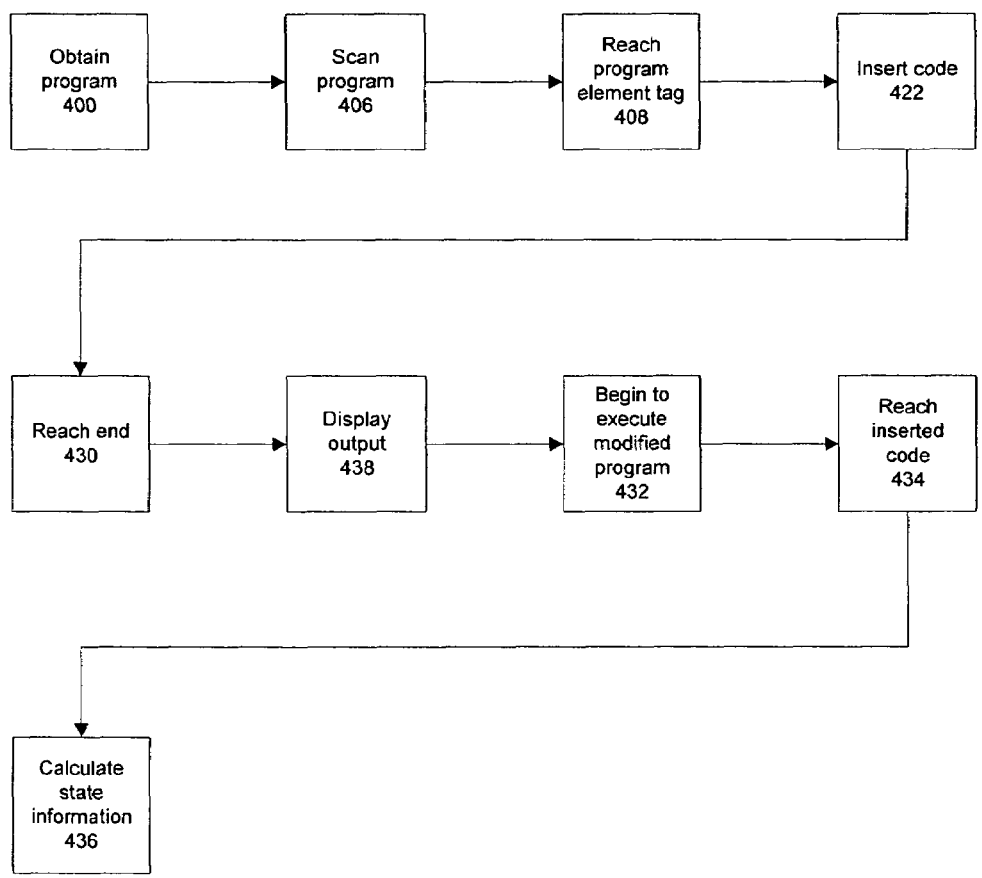
FIG. 4 is a flowchart that illustrates an example procedure in which to debug a program, according to an embodiment of the present invention.

FIG. 4 is a flowchart that illustrates an example procedure for debugging a program according to an embodiment of the present invention. In 400, a processor may obtain a program to be debugged. In 406, the processor may scan the program in search of program element tags.

In 408, the processor may reach a program element tag. In 422, the processor may insert code into the program. The code may be for outputting debugging comments during execution of the program. The processor may repeatedly proceed as described with respect to 406 to 422 until the processor reaches the end of the program. In 430, the processor may reach the end of the program.

In 432, the processor may begin to execute the modified program. In 434, the processor may reach the code inserted in 422. In 436, the processor may calculate state information. For example, the processor may determine the column and lines of program code to which the inserted code pertains. The processor may also determine a particular node to which the inserted code pertains. In 438, the processor may display output of the executed code. For example, while executing the new code, the processor may generate debugging comments. The displayed output may include a main output of the program and the debugging comments, which may reflect state information.

Figure 5:
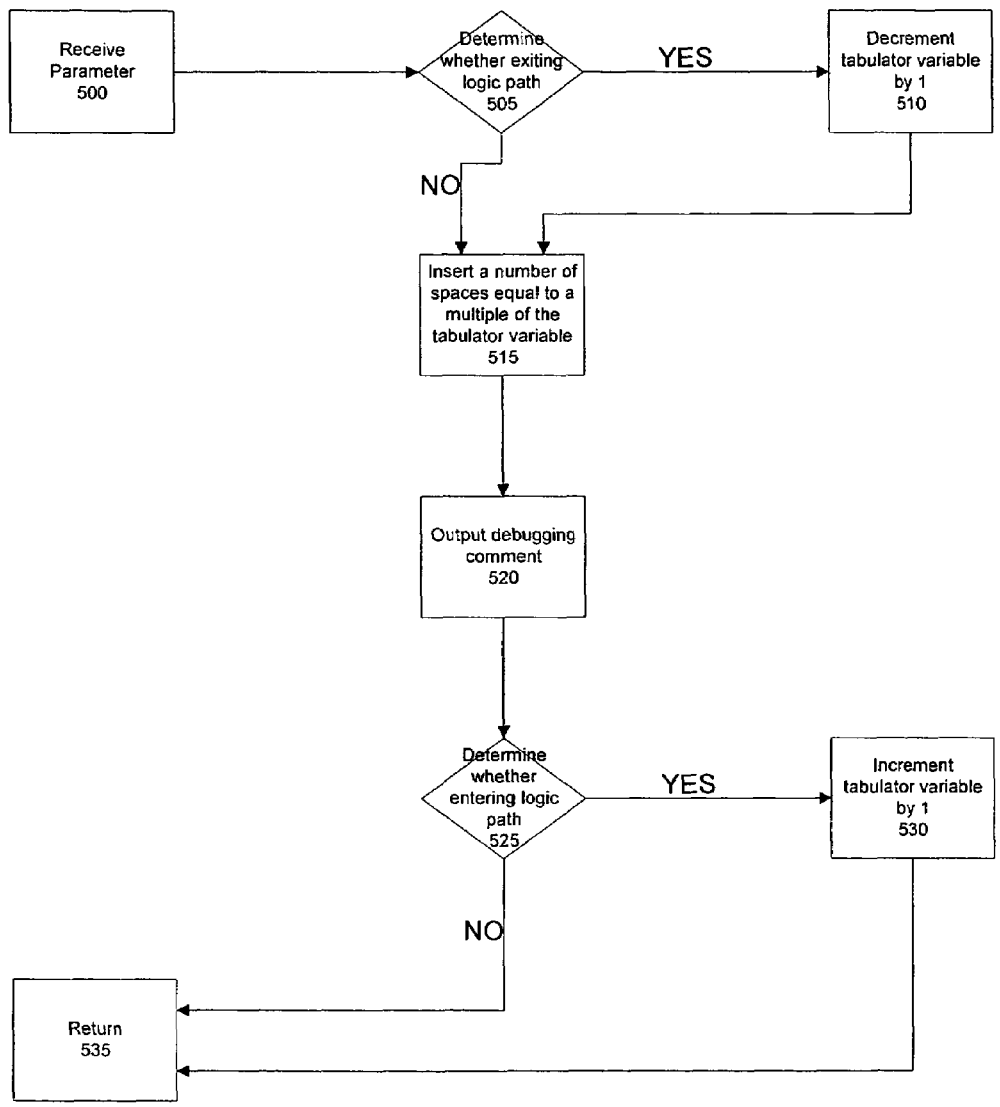
FIG. 5 is a flowchart that illustrates an example procedure in which to maintain state information for debugging comments, according to an embodiment of the present invention.

FIG. 5 is a flowchart that illustrates an example procedure in which a called routine may maintain state information and display a debugging comment based on the maintained state information. In an embodiment of the present invention, after outputting a debugging comment that indicates an entrance into a logic path, a processor executing the routine may increase an indentation setting for subsequent debugging comments. Accordingly, the subsequent debugging comments outputted for program elements within the logic path may be offset from the logic-path entrance and exit debugging comments. Before outputting a debugging comment that indicates an exit from the logic path, e.g., after outputting said subsequent debugging comments, the processor may decrease the indentation setting so that the entrance and exit debugging comments of the logic path may be aligned.

For example, in 500, the processor executing the routine called by the main program code may receive a parameter. The parameter may be, e.g., a string of text that states whether a program is entering or exiting a logic path. In 505, the processor may determine from the parameter whether the program is exiting the logic path. If the program is exiting the logic path, the processor may, in 510, decrement a tabulator variable by 1. In 515, the processor may output a number of white spaces. The number of white spaces may be equal to a multiple of the tabulator variable. For example, the processor may output a number of white spaces equal to 4 times the value of the tabulator variable.

If in 505 the processor determines that the program in not exiting the logic path, the processor may proceed directly to 515, without decreasing the value of the tabulator variable. In 520, the processor may output the debugging comment immediately following the outputted white spaces. After outputting the comment, the processor may, in 525, determine whether the program is entering the logic path. If the program is not entering the logic path, the processor, in 535, may return to the main program code. Otherwise, the processor, in 530, may increment the tabulator variable by 1, and may then proceed to 535.

The tabulator variable may be stored in a file to which the processor executing the routine has access. The value of the tabulator variable may be maintained between the calls to the routine. Consequently, during execution of the routine in response to a first call to the routine, the processor may increment the tabulator variable in 530 after outputting a first debugging comment indicating an entrance into a first logic path. Then, during execution of the routine in response to a second call to the routine, the processor may, in 520, output a second debugging comment indicating an entrance into a second logic path, such that the second debugging comment is offset from the previously output first debugging comment.

In an embodiment of the present invention, comments for variables of a logic path may be offset from comments of the variables' corresponding logic path. For example, the processor may insert white spaces based on the tabulator variable set during execution of the routine in which the processor output the entrance comment for the logic path.

In an alternative embodiment, the processor may align comments of all program elements of a particular logic path with the comments indicating the entrance and exit from the logic path. According to this embodiment, after receiving the parameter in 500, the processor may determine whether the program is entering a logic path. If the processor determines that the program is not entering the logic path, the processor may proceed to 515 to output white spaces. If the processor determines that the program is entering the logic path, the processor may increment the tabulator variable. After outputting the debugging comment in 520, the processor may determine whether the program is exiting the logic path. If the processor determines that the program is not exiting the logic path, the processor may proceed to 535. Otherwise, the processor may decrement the tabulator variable. Thus, according to this embodiment, performance of 505 and 510 is swapped with performance of 525 and 530.

Each of the variables of the logic path may be aligned with each other. Alternatively, the processor may also keep a log of the variables of the logic path. Before outputting a debugging comment for a particular variable, the processor may determine whether, within the relevant logic path, a debugging comment has been output for a parent variable of the particular variable. If the processor determines that a debugging comment for a parent variable has been output, the processor may increment said tabulator variable, or a separate variable tabulator variable. The processor may accordingly output white spaces to offset the debugging comment of the child variable from the debugging comment of the parent variable. For example, if the processor determines that a variable is a child variable, the processor may increment the separate variable tabulator variable. The processor may then add the two tabulator variables to output the white spaces.

Figure 6:
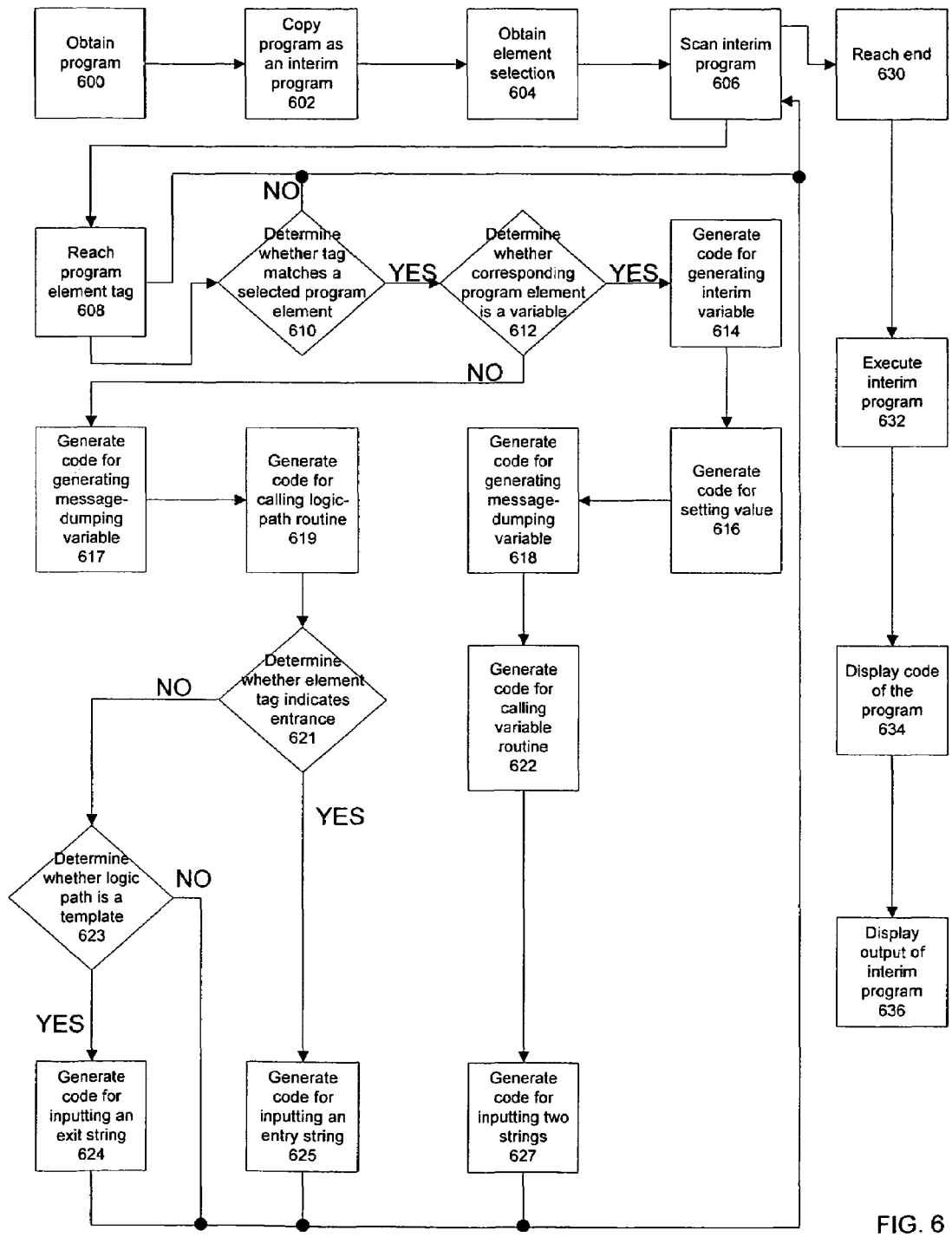
FIG. 6 is a flowchart that illustrates an example procedure in which to generate logic path and variable debugging comments, according to an embodiment of the present invention.

FIG. 6 is a flowchart that illustrates an example procedure for generating debugging comments for variables and other program elements according to an embodiment of the present invention. In 600, a processor may obtain a program to be debugged. In 602, the processor may copy the program as an interim program into which the processor may insert code for generating debugging comments. In 604, the processor may obtain, e.g., from a user, an element selection in which the user selects particular program elements or categories of program elements to be tracked. Alternatively, in one embodiment, the processor may select all program elements by default. In 606, the processor may scan the interim program in search of program element tags that correspond to the selected program elements.

In 608, the processor may reach a program element tag. In 610, the processor may determine whether the element tag matches a selected program element. If the element tag does not correspond to a selected program element, the processor may return to 606 to continue scanning the interim program. Otherwise, the processor may determine whether the element tag's corresponding program element is a program variable.

If the corresponding program element is a program variable, the processor may, in 614, insert code for generating an interim variable, and may, in 616, insert code for setting a value of the interim variable equal to a value of the program variable or an entire node-set of the program variable. In 618, the processor may insert code for generating a message-dumping variable. To set a value of the message-dumping variable, the processor may, in 622, insert code for calling a variable routine, e.g., an externally located lava routine. In 627, the processor may insert code for inputting two strings as parameters of the called variable routine. The first string may identify the program variable. The second string may be the interim variable's value.

If the corresponding program element is a logic-path element, the processor may, in 617, proceed as described with respect to 618. In 619, the processor may generate code for calling a logic-path routine. In 621, the processor may determine whether the element tag indicates an entrance into a logic path. If it is determined that the element indicates an entrance into a logic path, the processor may, in 625, generate code for inputting a string as a parameter of the called logic-path routine. The string may be a statement that indicates the program's entrance into the logic path. If it is otherwise determined that the element indicates an exit from the logic path, the processor may, in 623, determine whether the logic path is a template. If it is determined that the logic path is not a template, the processor may return to 606 to continue to scan the interim program. If it is otherwise determined that the logic path is a template, the processor may, in 624, insert code for inputting a string as a parameter of the called logic-path routine. The string may be a statement that indicates the program's exit from the logic path.

After the processor generates the code for inputting the parameters of called routines in 624, 625, or 627, the processor may return to 606 to continue to scan the interim program for other program element tags. In 630, the processor may reach the end of the interim program. In 632, the processor may execute the interim program, including the called routines. In 634, the processor may display, e.g., in a window of a GUI, the code of the program obtained in 600. In 636, the processor may display output of the executed interim program in a second window that may be adjacent to the window in which is displayed the program code. The processor may format the output so that the debugging comments of the output of the executed program are displayed directly adjacent to or approximately adjacent to code that represents the comments' corresponding program elements.

The sequence of operations of FIG. 6 is illustrated by way of example only. The processor may perform the operations in alternative sequences. For example, in one alternative embodiment, the processor may determine whether a logic path is a template prior to generating code for calling a logic-path routine.

Those skilled in the art can appreciate from the foregoing description that the present invention can be implemented in a variety of forms. Therefore, while the embodiments of this invention have been described in connection with particular examples thereof, the true scope of the embodiments of the invention should not be so limited since other modifications will become apparent to the skilled practitioner upon a study of the drawings, specification, and following claims.

What is claimed is:

1. A method for debugging Extensible Stylesheet Language (XSL) programs, comprising:

automatically locating program elements, including at least one of a program variable and a program logic path, within a first code of a first XSL program;

for each located program element, automatically modifying the first XSL program by inserting into the first XSL program a second code for setting an XSL variable not included in the first code, the setting of the XSL variable including implementing a routine, the routine (a) generating a debugging comment regarding the first code when executed and (b) coded in a programming language that provides an element for maintaining a state information regarding a portion of the first code that corresponds to manipulation of the program element for which the debugging comment is generated, wherein the debugging comment is based on the state information for the respective program element; and executing the modified first XSL program;

wherein:

the debugging comments are integrated with a main output generated via execution of the first code, the integration including the debugging comments being interspersed between, and offset from, portions of the main output, such that a debugging comment is displayed on an output line that is sandwiched between a first output line including a first portion of the main output and a second output line including a second portion of the main output, a beginning of the debugging comment being displayed at an output column offset from output columns at which the first and second portions of the main output begins;

for each located program element, the corresponding state information includes at least one of (a) a column and line location of the respective portion of the first code and (b) a hierarchical level of the respective program element; and the method further comprises:

for each located program variable for which the first XSL program is modified, inserting into the first XSL program a copy of the program variable to mimic the located program variable, wherein the modified first XSL program including the first code is executed such that: (a) a portion of the first code that includes the program variable is executed, and (b) for the execution of the portion of the first code, a debugging comment is generated for the variable copy.

2. The method of claim 1, wherein the programming language is an object-oriented and platform independent programming language.

3. The method of claim 1, wherein, for each of at least one of the located program elements, the debugging comment includes the column and line location of the respective portion of the first code.

4. The method of claim 1, wherein, for each of at least one of the located program elements, the debugging comment is indented, and an extent of the indentation corresponds to the hierarchical level of the located program element as indicated by the state information.

5. The method of claim 4, wherein:
the program elements are arranged as a node-set;
a subset of the node-set is executed; and
the extent of indentation indicates a position of the debugging comment's corresponding program element within a genealogical line of the subset of the node-set.

6. The method of claim 4, wherein:
for each of at least a subset of the inserted second codes, the respective routine updates an indentation variable in response to a change in a hierarchical level; and
for each of the inserted second codes, the respective routine indents the respective debugging comment based on the indentation variable.

7. The method of claim 1, wherein:
the program elements include the program logic path and the program variable;
the program logic path is located by identifying a path tag; and
the program variable is located by identifying a variable tag.

8. The method of claim 7, wherein the program logic path is one of a for-each branch, a when-branch, and an if-branch.

9. The method of claim 8, wherein the debugging comment corresponding to the program logic path includes a first comment generated for an entry into the program logic path and a second comment generated for an exit out of the program logic path.

10. The method of claim 7, wherein the debugging comment corresponding to the program variable identifies the program variable and indicates a value of the program variable.

11. The method of claim 10, wherein:
the program elements are arranged as a node-set;
the program variable is a child node of a parent node; and
the debugging comment corresponding to the program variable identifies the parent node and indicates a value of the parent node.

12. The method of claim 10, wherein the value is retrieved from a location inaccessible to an XSL code.

13. The method of claim 1, further comprising:
adjacently displaying the first code of the first XSL program and an output of the executed modified first XSL program.

14. The method of claim 1, wherein implementing the routine includes calling the routine during execution of the modified first XSL program.

15. The method of claim 1, wherein the state information is information about a state of execution of the first code, and the element for maintaining the state information is one of a file, a class, a variable, a structure, and a register.

16. The method of claim 1, wherein:
the program elements include a plurality of program logic paths;
the debugging comments include exit comments noting exits from respective ones of the logic paths;
the exit comments are provided for only a subset of the plurality of logic paths, the subset being user-selectable.

17. The method of claim 1, wherein the program variable copy is set to an entire node set to which the located program variable belongs.

18. The method of claim 1, further comprising:
displaying the first code; and
responsive to user input for placement of a pointer on or in proximity with a located program element in the displayed first code, displaying a debugging comment corresponding to the located program element over or near the located program element in the displayed first code.

19. A method for debugging programs, comprising:
automatically locating program elements, including at least one of (a) a program variable; and (b) the program variable and a program logic path, within a first code of an Extensible Stylesheet Language (XSL) program;
for each located program element, automatically modifying the first code by inserting into the first code a second code for setting an XSL variable not included in the first code, the setting of the XSL variable including implementing a routine, the routine, when executed, generating a debugging comment based on a respective state information regarding a portion of the first code that corresponds to manipulation of the respective program element; and
executing the modified first code;
wherein:
the debugging comments are integrated with a main output of the XSL program, the integration including the debugging comments being interspersed between, and offset from, portions of the main output, such that a debugging comment is displayed on an output line that is sandwiched between a first output line including a first portion of the main output and a second output line including a second portion of the main output, a beginning of the debugging comment being displayed at an output column offset from output columns at which the first and second portions of the main output begins;
for each located program element, the corresponding state information includes at least one of (a) a column and line location of the respective portion of the first code and (b) a hierarchical level of the respective program element;
the method further comprises:
receiving a user-selection of one of a plurality program elements;
determining which of the plurality of program elements belong to a same element category of the selected program element;
applying the selection to all of the program elements determined to belong to the category;
debugging comments are selectively provided, based on the determination, for those program elements that are determined to have been user-selected; and
the method further comprises, for each located program variable for which the XSL program is modified to provide a debugging comment, inserting into the XSL program a copy of the program variable to mimic the located program variable, wherein the modified XSL program including the first code is executed such that: (a) a portion of the first code that includes the program variable is executed, and (b) for the execution of the portion of the first code, a debugging comment is generated for the variable copy.

20. The method of claim 19, wherein element categories include a variable category, a logic path category, and a template category.

21. An article of manufacture comprising a computer-readable medium having stored thereon instructions adapted to be executed by a processor, the instructions which, when executed, define a method for debugging Extensible Stylesheet Language (XSL) programs, the method comprising:
automatically locating program elements, including at least one of (a) a program variable; and (b) the program variable and a program logic path, within a first code of a first XSL program;
for each located program element, automatically modifying the first code by inserting into the first code a second code for setting an XSL variable not included in the first code, the setting of the XSL variable including implementing a routine, the routine generating a debugging comment when executed and coded in a programming language that provides an element for maintaining a state information regarding a portion of the first code that corresponds to manipulation of the program element for which the debugging comment is generated, wherein the debugging comment is based on the state information for the respective program element; and
executing the modified first code; and
adjacently displaying, by the processor, the first code of the first XSL program and an output of the executed modified first code such that, for each of the debugging comments output by execution of the modified first code, at least a portion of the respective debugging comment is automatically displayed directly adjacent to at least a part of a respective portion of the first code to which the respective debugging comment corresponds;
wherein:
the method further comprises, for each located program variable for which the first XSL program is modified, inserting into the first XSL program a copy of the program variable to mimic the located program variable;
the modified first XSL program including the first code is executed such that: (a) a portion of the first code that includes the program variable is executed, and (b) for the execution of the portion of the first code, a debugging comment is generated for the variable copy;
the debugging comment is integrated with a main output of the first XSL program; and
for each located program element, the corresponding state information includes at least one of (a) a column and line location of the respective portion of the first code and (b) a hierarchical level of the respective program element.

22. A system for debugging Extensible Stylesheet Language (XSL) programs, comprising:
a processor configured to:
automatically locate program elements including variables and selected program paths within a first code of a first XSL program;
for each located program element, automatically modify the first code by an insertion into the first code of a second code for setting an XSL variable not included in the first code, the setting of the XSL variable including implementation of a routine, the routine generating a debugging comment when executed and coded in a programming language that provides an element for the maintenance of state information regarding a portion of the first code that corresponds to manipulation of the respective program element,
wherein the debugging comment is based on the state information for the respective program element; and
execute the modified first code; and
an output device;
wherein:
the debugging comment is integrated with a main output of the first XSL program;
for each located program element, the corresponding state information includes at least one of (a) a column and line location of the respective portion of the first code and (b) a hierarchical level of the respective program element;
the processor is configured to copy code of a second XSL program to generate the first program, and adjacently display, via the output device, the code of second program and the integrated debugging comment and main output of the executed first program;
the displayed code and main output are formatted such that at least a portion of the debugging comment is automatically displayed directly adjacent to at least a part of a respective portion of the displayed code to which the debugging comment corresponds;
the processor is configured to, for each located variable for which the first XSL program is modified, insert into the first XSL program a copy of the variable to mimic the located variable; and
the modified first XSL program including the first code is executed such that: (a) a portion of the first code that includes the program variable is executed, and (b) for the execution of the portion of the first code, a debugging comment is generated for the variable copy.

23. The system of claim 22, wherein the programming language is an object-oriented and platform independent programming language.

24. The system of claim 22, wherein, for each of at least one of the located program elements, the debugging comment includes the column and line location of the respective portion of the first code.

25. The system of claim 22, wherein, for each of at least one of the located program elements, the debugging comment is indented, and an extent of the indentation corresponds to the hierarchical level of the located program element as indicated by the state information.

26. The system of claim 25, wherein:
the program elements are arranged as a node-set;
a subset of the node-set is executed; and
the extent of indentation indicates a position of the debugging comment's corresponding program element within a genealogical line of the subset of the node-set.

27. The system of claim 22, wherein:
the program elements include a program path and a program variable;
the program path is located by an identification of a path tag; and
the program variable is located by an identification of a variable tag.

28. The system of claim 27, wherein the program path is one of a template, a for-each branch, a when-branch, and an if-branch.

29. The system of claim 28, wherein the debugging comment corresponding to the program path includes a first comment generated for an entry into the program path and a second comment generated for an exit out of the program path.

30. The system of claim 27, wherein the debugging comment corresponding to the program variable identifies the program variable and indicates a value of the program variable.

31. The system of claim 30, wherein:
the program elements are arranged as a node-set;
the program variable is a child node of a parent node; and
the debugging comment corresponding to the program variable identifies the parent node and indicates a value of the parent node.

32. The system of claim 30, wherein the value is retrieved from a location inaccessible to an XSL code.

33. The system of claim 22, wherein the implementation of the routine includes a call to the routine during execution of the modified first code.

34. The system of claim 22, wherein the state information is information about a state of execution of the modified first code, and the element for maintaining the state information is one of a file, a class, a variable, a structure, and a register.

35. A method for analyzing a program, comprising:
automatically locating program elements, including program variables, within a first code of an Extensible Stylesheet Language (XSL) program;
for each located program element, automatically modifying the XSL program by inserting into the XSL program a second code for setting an XSL variable not included in the first code, the setting of the XSL variable including implementing a routine, the routine, when executed, generating a comment based on a state information regarding a portion of the first code that corresponds to manipulation of the respective program element;
executing the modified XSL program; and
displaying each said comment based on state information;
wherein:
the comments are integrated with a main output generated via execution of the first code;
the integration includes the comments being interspersed between, and offset from, portions of the main output, such that a debugging comment is displayed on an output line that is sandwiched between a first output line including a first portion of the main output and a second output line including a second portion of the main output, a beginning of the debugging comment being displayed at an output column offset from output columns at which the first and second portions of the main output begins; and
for each located program element, the corresponding state information includes at least one of (a) a column and line location of the respective portion of the first code and (b) a hierarchical level of the respective program element; and
the method further comprises:
for each located program variable for which the XSL program is modified, inserting into the XSL program a copy of the program variable to mimic the located program variable, wherein the modified XSL program including the first code is executed such that: (a) a portion of the first code that includes the program variable is executed, and (b) for the execution of the portion of the first code, a debugging comment is generated for the variable copy.

36. A method for debugging Extensible Stylesheet Language (XSL) programs, comprising:
automatically locating program elements, including at least one of (a) a program variable; and (b) the program variable and a program logic path, within a first code of a first XSL program;
for each located program element, automatically modifying the first code by inserting into the first code a second code for setting an XSL variable not included in the first code, the setting of the XSL variable including implementing a routine, the routine generating a debugging comment when executed and coded in a programming language that provides an element for maintaining a state information regarding a portion of the first code that corresponds to manipulation of the program element for which the debugging comment is generated, wherein the debugging comment is based on the state information for the respective program element; and
executing the modified first code;
wherein:
the debugging comments are integrated with a main output of the first XSL program, the integration including the debugging comments being interspersed between, and offset from, portions of the main output, such that a debugging comment is displayed on an output line that is sandwiched between a first output line including a first portion of the main output and a second output line including a second portion of the main output, a beginning of the debugging comment being displayed at an output column offset from output columns at which the first and second portions of the main output begins;
for each located program element, the corresponding state information includes at least one of (a) a column and line location of the respective portion of the first code and (b) a hierarchical level of the respective program element;
for each of at least a subset of the inserted second codes, the respective routine updates an indentation variable in response to a change in a hierarchical level;
for a logic path:
responsive to entrance into a logic path and subsequent to generating a debugging comment output that corresponds to the entrance into the logic path, the indentation variable is incremented; and
responsive to exit from the logic path and prior to generating a debugging comment output that corresponds to the exit from the logic path, decrementing the indentation variable;
for each of the inserted second codes, the respective routine indents the respective debugging comment based on the indentation variable;
the method further comprises, for each located program variable for which the first XSL program is modified, inserting into the first XSL program a copy of the program variable to mimic the located program variable; and
the modified first XSL program including the first code is executed such that: (a) a portion of the first code that includes the program variable is executed, and (b) for the execution of the portion of the first code, a debugging comment is generated for the variable copy.

37. The method of claim 36, wherein:
each increment and decrement of the indentation variable is by 1;
a number of spaces output prior to each output debugging comment is calculated as a multiple of a present value of the indentation variable;
whether a logic path is being entered into or exited therefrom is determined based on a parameter passed to the routine; and
the indentation variable is maintained between executions of the respective debugging comment output routines.

* * * * *

UNITED STATES PATENT AND TRADEMARK OFFICE
CERTIFICATE OF CORRECTION

PATENT NO.       : 7,620,937 B2                                    Page 1 of 1
APPLICATION NO.  : 10/923215
DATED            : November 17, 2009
INVENTOR(S)      : Narayana et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 920 days.

Signed and Sealed this

Twenty-sixth Day of October, 2010

David J. Kappos
*Director of the United States Patent and Trademark Office*